United States Patent
Kobayashi et al.

[11] Patent Number: 5,282,886
[45] Date of Patent: Feb. 1, 1994

[54] GAS ADSORPTION AND DESORPTION METHOD

[75] Inventors: Satoru Kobayashi; Koichi Mizuno, both of Tsukuba; Satoshi Kushiyama, Tsuchiura; Reiji Aizawa, Ushiku; Yutaka Koinuma, Ibaraki; Hideo Ohuchi, Tsukuba, all of Japan

[73] Assignee: Director-General of Agency of Industrial Science and Technology, Japan

[21] Appl. No.: 942,391

[22] Filed: Sep. 9, 1992

[30] Foreign Application Priority Data

Sep. 13, 1991 [JP] Japan .................. 3-262878

[51] Int. Cl.⁵ .............................. B01D 53/04
[52] U.S. Cl. .............................. 95/131; 95/132; 95/142; 95/144; 95/148
[58] Field of Search .............. 55/25, 26, 28, 31, 33, 55/62, 68, 74, 75, 208, 387, 389

[56] References Cited

U.S. PATENT DOCUMENTS

| | | | |
|---|---|---|---|
| 4,038,050 | 7/1977 | Lowther | 55/33 X |
| 4,094,652 | 6/1978 | Lowther | 55/33 |
| 4,101,296 | 7/1978 | Lowther | 55/33 |
| 4,312,640 | 1/1982 | Verrando | 55/33 |
| 4,312,641 | 1/1982 | Verrando et al. | 55/33 |
| 4,322,394 | 3/1982 | Mezey et al. | 55/33 X |

FOREIGN PATENT DOCUMENTS

| | | | |
|---|---|---|---|
| 3413487 | 10/1985 | Fed. Rep. of Germany | 55/208 |
| 54-107477 | 8/1979 | Japan | 55/28 |
| 55-061918 | 5/1980 | Japan | 55/208 |
| 61-209029 | 9/1986 | Japan | 55/208 |
| 61-271032 | 12/1986 | Japan | 55/208 |
| 2066695 | 7/1981 | United Kingdom | 55/208 |

*Primary Examiner*—Robert Spitzer
*Attorney, Agent, or Firm*—Lorusso & Loud

[57] ABSTRACT

A mixed gas is contacted with a non-carbonaceous adsorbent while irradiating the adsorbent with an electromagnetic wave having a frequency of 1 MHz to 25 GHz, such as a microwave, so that a gas component having a smaller coefficient of dielectric loss is selectively adsorbed by the adsorbent. A gas adsorbed on an adsorbent may be desorbed therefrom by contact with a desorbing gas while irradiating the adsorbent with the above electromagnetic wave.

14 Claims, 2 Drawing Sheets

FIG. 1
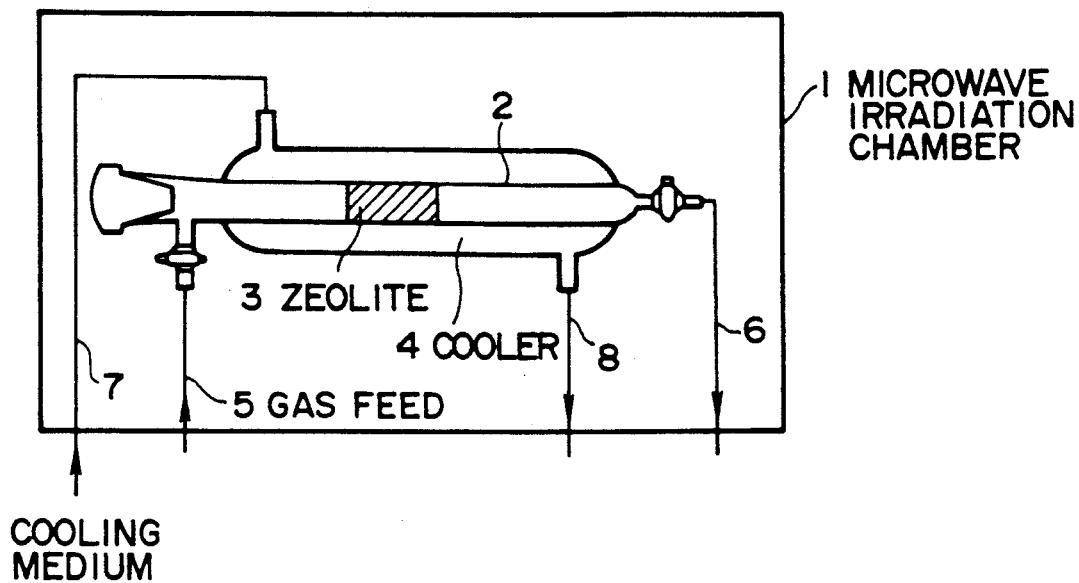
FIG. 2a
FIG. 2b
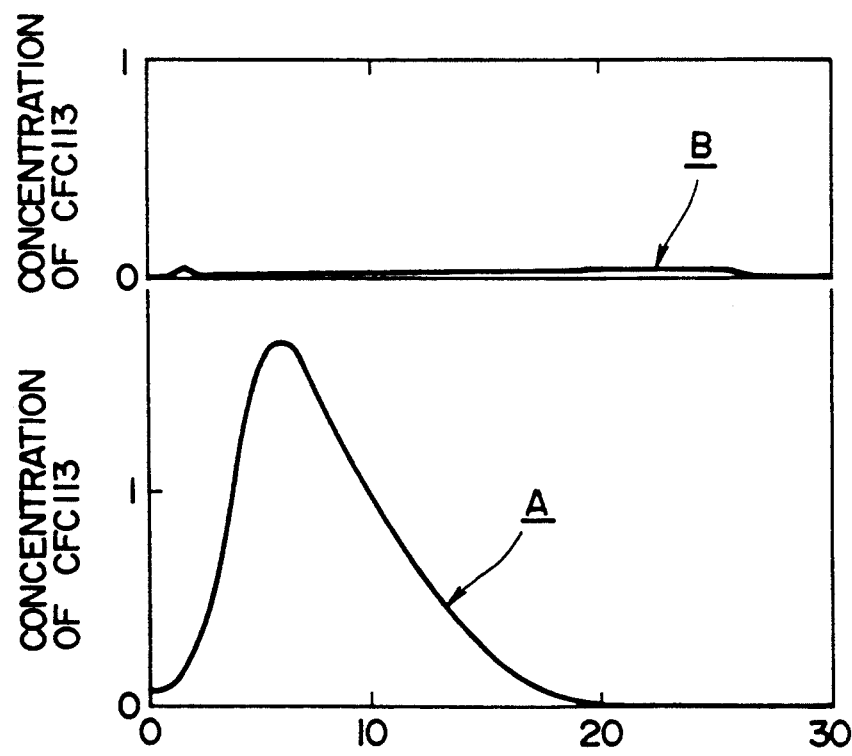

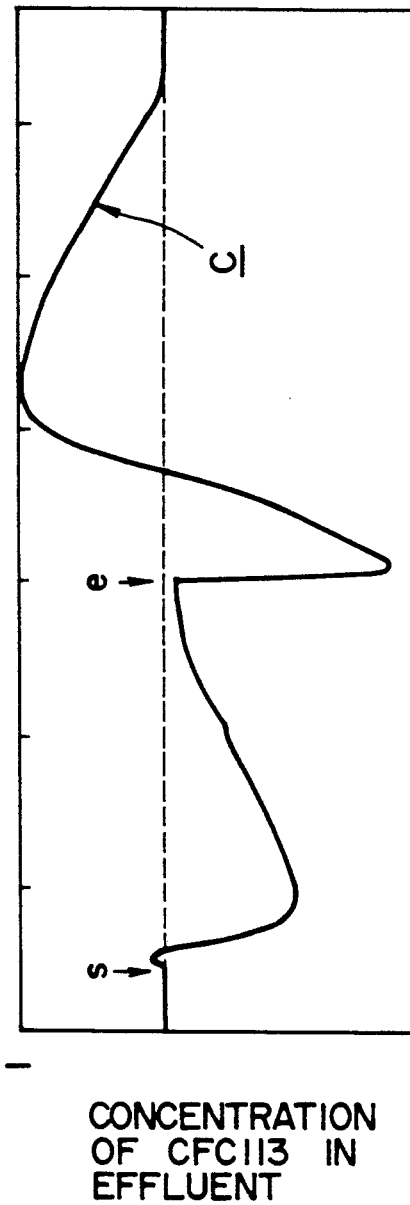
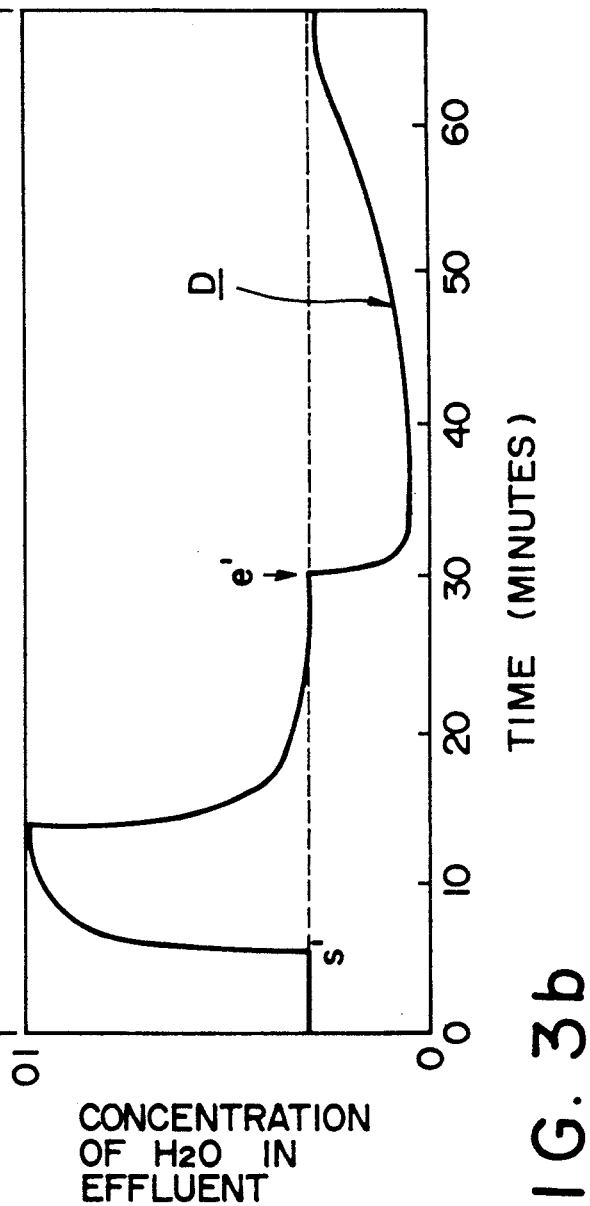

GAS ADSORPTION AND DESORPTION METHOD

BACKGROUND OF THE INVENTION

This invention relates generally to a gas adsorption and desorption method using an adsorbent. More specifically, the present invention is directed to a method of treating a gas mixture for separating respective components thereof by adsorption and to a method of desorbing a gas adsorbed on a non-carbonaceous adsorbent.

Treatment of a gas mixture with an adsorbent such as activated carbon, silica gel, alumina or zeolite for separation of respective components thereof is now widely carried out in various fields. A packed bed, moving bed or fluidized bed system is generally employed for such a treatment.

In order to effectively perform adsorption and desorption, it is important to select a suitable adsorbent and to use suitable temperature and pressure. In particular, the selection of a suitable adsorbent is essential especially when the gas to be treated contains two or more components to be separated from each other. When there is available an adsorbent having a high selectivity to one of the components of the gas to be treated, such an adsorbent is generally used even if the adsorption power thereof is not fully satisfactory. For example, when a gas containing a chlorofluorocarbon and moisture is to be treated, activated carbon is used notwithstanding the fact that the chlorofluorocarbon is more adsorptive to zeolite than to activated carbon, because of the strong adsorbing power of the zeolite to moisture.

Relative adsorbability of two gaseous components contained in a gas to be treated can be changed to some extent by varying temperature and pressure at which the adsorption of the gas is performed. However, it is practically very difficult to control the selectivity by temperature and pressure.

Thus, in the conventional adsorption method, it is very difficult to effectively treat a mixed gas containing two or more components using an adsorbent which can adsorb at least two of the components. Similarly, in desorption, it is difficult to selectively desorb one of a plurality of the adsorbed gas components from the adsorbent by control of the temperature and pressure.

SUMMARY OF THE INVENTION

It is, therefore, an object of the present invention to provide a method of separating two or more gaseous components contained in a gas, which permits the use of an adsorbent showing high adsorption power to respective components.

Another object of the present invention is to provide a method of the above-mentioned type which can separate one of the gaseous components by selective adsorption thereof.

It is a further object of the present invention to provide a method of selectively desorbing one of the gaseous components adsorbed on an adsorbent.

In accomplishing the foregoing objects, there is provided in accordance with the present invention a method of treating a gas containing at least two, first and second gaseous components for the separation of respective components from each other, wherein the first component has a coefficient of dielectric loss which is at least 10 times as great as that of the second component and wherein the first and second components are adsorbable by a solid adsorbent having a coefficient of dielectric loss of 0.01 or less. The method comprises a step of contacting the gas with the adsorbent while irradiating the adsorbent with an electromagnetic wave having a frequency of 1 MHz to 25 GHz so that the second component is selectively adsorbed by the adsorbent.

In another aspect, the present invention provides a method of desorbing a gas adsorbed on an adsorbent and having a coefficient of dielectric loss of 0.5 or more. The method comprises a step of contacting a gaseous desorbing medium with the adsorbent while irradiating the adsorbent with an electromagnetic wave having a frequency of 1 MHz to 25 GHz.

It is well known that when exposed to an environment where a microwave is being irradiated or where a high frequency electric voltage is impressed, a dielectric is heated through dielectric loss in accordance with the following equation:

$$P = 0.556 \times 10^{-10} \cdot f \cdot E^2 \cdot \epsilon \cdot \tan \delta$$

wherein P represents an absorption energy per unit volume of the dielectric, f is the frequency of the microwave or high frequency, E is the intensity of the electric field, $\epsilon$ is the specific dielectric constant of the dielectric and $\tan \delta$ is the dielectric loss angle. The product $\delta \cdot \tan \delta$ is called coefficient of dielectric loss.

When two gaseous components, which are adsorbable to an adsorbent and which have different dielectric loss coefficients, are contacted with the adsorbent while irradiating the adsorbent with a microwave or a high frequency electric wave, the component having a greater dielectric loss coefficient is energized and becomes less adsorbable to the adsorbent, so that the component having a smaller dielectric loss coefficient is selectively adsorbed by the adsorbent.

The high-frequency heating, which can directly heat the dielectric (gaseous component), is also effective in desorbing the gaseous component adsorbed on an adsorbent. When two or more gaseous components having different dielectric loss coefficients are adsorbed on the adsorbent, the high-frequency heating can selectively desorb the gaseous components having a greater dielectric loss coefficient.

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIG. 1 is a schematic representation of an apparatus used to carry out the method of the present invention;

FIG. 2A shows the elution pattern of a chlorofluorocarbon obtained in Example 1 which will be described hereinafter;

FIG. 2B shows such an elution pattern for Comparative Example 1; and

FIG. 3A shows the elution pattern of a chlorofluorocarbon and

FIG. 3B shows the elution pattern of moisture obtained in Example 2 which will be described hereinafter.

DETAILED DESCRIPTION OF THE PREFERRED EMBODIMENTS OF THE INVENTION

Any solid adsorbent may be used for the purpose of the present invention as long as it is a non-carbonaceous adsorbent. An adsorbent having a low coefficient of dielectric loss, e.g. less than 0.01, is suitably used. Examples of preferable adsorbents include silica gel, alumina, zeolite, titania, a clay mineral or a particulate synthetic resin such as an ion-exchange resin or porous polymer beads.

The gas to be treated in accordance with the adsorption method of the present invention is a mixture containing at least two, first and second gaseous components each adsorbable by the above adsorbent. The first component has a coefficient of dielectric loss which is at least 10 times, preferably 20-100 times, as great as that of the second component. Preferably, the second component has a coefficient of dielectric loss of 0.5 or less, more preferably 0.01-0.05. Illustrative of the first components are moisture, methanol and ammonia. Illustrative of the second components are halogenated hydrocarbons such as chlorofluorocarbons, toluene and chlorine.

The high-frequency heating is effected by irradiation of an electromagnetic wave having a frequency of 1 MHz to 25 GHz, preferably 5 MHz to 5 GHz. A microwave and a high frequency electric wave have such a frequency. The frequency of the electromagnetic wave may be suitably determined in view of the dielectric loss coefficients of the gaseous components and the penetrability of the wave into the adsorbent. Practically, the frequency may be determined by measurement of temperature distribution of the adsorbent layer upon irradiation. The adsorption treatment is preferably performed at a temperature of not higher than 80° C., more preferably not higher than 50° C.

In the desorption method according to the present invention, an adsorbent having adsorbed thereto a gas having a coefficient of dielectric loss of 0.5 or more is desorbed is contacted with a gaseous desorbing medium while being irradiated with an electromagnetic wave having a frequency of 1 MHz to 25 GHz. The adsorbent to be used in the desorption method is the same as that described above in connection with the adsorption method. Also, the gas to be desorbed may be the abovementioned first or second gaseous component. When the adsorbent bears two gaseous components, one which has a greater dielectric loss coefficient is selectively desorbed. Any gas may be used as the gaseous desorbing medium as long as it is not adsorbable by the adsorbent. Illustrative of suitable desorbing media are nitrogen gas, argon gas, helium gas and air.

The following examples will further illustrate the present invention.

EXAMPLE 1

An apparatus as shown in FIG. 1 was used for the treatment of a gas. In FIG. 1, the reference numeral 1 denotes a microwave irradiation chamber of a commercially available electronic oven (500 W, 2.45 GHz). Disposed within the chamber 1 is a quartz glass tube 2 in which a bed of NaY zeolite is packed. Opposite ends of the tube 2 are connected to gas feed and discharge lines 5 and 6. A cooling jacket 4 is provided around the tube 2 for maintaining the zeolite bed 3 at a predetermined temperature. A cooling medium (1,1,2,2-tetrachloro-1,2-difluoroethane) is introduced into the jacket 4 through a line 7 and discharged therefrom through a line 8.

A gas containing 1060 ppm of 1,1,2-trichloro-1,2,2-trifluoroethane (CFC113) and 0.86% by weight of $H_2O$ (remainder being essentially nitrogen gas) was fed to the glass tube 2 and allowed to pass through the packed zeolite bed 3 at a temperature of 25° C. at a flow rate of 500 ml per minute for 30 minutes while irradiating the zeolite with the microwave. Thereafter, the feed of the gas and the irradiation of the microwave were stopped. A nitrogen gas was then fed to the glass tube 2 at a flow rate of 500 ml per minute while heating the zeolite 3 from 20° C. to 120° C. at a heating rate of 5° C. per minute. The discharged gas was directly introduced into a mass spectrometer to measure the concentration of the chlorofluorocarbon. The results are shown in FIG. 2A as curve A. In FIG. 2A, a concentration of the chlorofluorocarbon of 1060 ppm is shown as "1".

COMPARATIVE EXAMPLE 1

Example 1 was repeated in the same manner as described except that the microwave irradiation was not carried out. The results are shown in FIG. 2A as curve B.

From the results shown in FIG. 2A, it is seen that when the adsorption is performed without the microwave irradiation, the chlorofluorocarbon is hardly adsorbed. This is because the zeolite preferentially adsorbs $H_2O$. With the microwave irradiation, on the other hand, the adsorption of the chlorofluorocarbon effectively occurs, because the $H_2O$ is energized by the irradiation and is not adsorbed by the zeolite.

EXAMPLE 2

Using an apparatus as shown in FIG. 1, a gas containing 1040 ppm of CFC113 and 0.86% by weight of $H_2O$ (remainder being essentially nitrogen gas) was fed to the glass tube 2 and allowed to pass through the packed bed 3 of zeolite (0.7 g) at a temperature of 30°-50° C. at a flow rate of 500 ml per minute until a break through point was reached. Then, while continuing the feed of the gas, the irradiation of the microwave (300 W) was initiated. The irradiation was continued until the concentration of the chlorofluorocarbon in the effluent was similar to that in the feed gas. After the termination of the microwave irradiation, the feed of the gas was still continued. Throughout the above procedure, the concentration of the chlorofluorocarbon in the effluent gas was monitored by mass spectrometer. The results are shown in FIG. 3A as curve C, in which the time point "s" represents the start point of the microwave irradiation while the time point "e" represents the end point of the irradiation.

The above procedure was repeated while monitoring the concentration of $H_2O$ in the effluent, to give the results shown in FIG. 3B as curve D. The points "s'" and "e'" represent the start point and end point of the microwave irradiation, respectively.

From the results shown in FIG. 3, it is seen that the microwave irradiation can cause the desorption of $H_2O$ with the simultaneous adsorption of the chlorofluorocarbon. As the irradiation proceeds, the adsorption of the chlorofluorocarbon and the desorption of water again reach to the break through point. When the irradiation is interrupted (points e and e'), adsorption of water occurs. Since the irradiation with microwave also energizes the chlorofluorocarbon, adsorption of the chlorofluorocarbon occurs immediately after the stop of the irradiation. As the adsorption of water proceeds, however, the chlorofluorocarbon is desorbed. Then, the adsorption of water and the desorption of the chlorofluorocarbon reach to the break through point. It will be appreciated from the above results that by continuously feeding a mixed gas for contacting with an adsorbent while intermittently irradiating the adsorbent with high frequency wave, the separation treatment of the mixed gas can be continuously carried out.

EXAMPLE 3

Using an apparatus as shown in FIG. 1, a zeolite adsorbent to which CFC113 and $H_2O$ had been adsorbed was subjected to a desorption treatment. Thus, the adsorbent was packed in the tube 2 and a nitrogen gas was fed to the tube 2 at a rate of 500 ml per minute, while irradiating the adsorbent with the microwave. Throughout the irradiation, the adsorbent was maintained at 30°-50° C. The analysis of the effluent gas revealed that $H_2O$ was selectively discharged.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of treating a gas containing at least two, first and second gaseous components for the separation of respective components from each other, wherein said first component has a coefficient of dielectric loss which is at least 10 times as great as that of said second component and wherein said first and second components are adsorbable by a solid adsorbent having a coefficient of dielectric loss of 0.01 or less, said method comprising a step of contacting said gas with said adsorbent while irradiating said adsorbent with an electromagnetic wave having a frequency of 1 MHz to 25 GHz so that said second component is selectively adsorbed by said adsorbent.

2. A method as set forth in claim 1 wherein said adsorbent is silica gel, alumina, zeolite, titania, a clay mineral or a particulate synthetic resin.

3. A method as set forth in claim 1, wherein said first component is moisture, methanol or ammonia and said second component is a halogenated hydrocarbon, toluene or chlorine.

4. A method as set forth in claim 1, wherein said first component is moisture and said second component is a chlorofluorocarbon.

5. A method as set forth in claim 1, wherein said irradiation is performed while cooling said adsorbent.

6. A method as set forth in claim 1, wherein said gas is continuously fed to a contacting zone containing a packed layer of said adsorbent to bring said gas into contact with said adsorbent and wherein said irradiation with said electromagnetic wave is occasionally interrupted to desorb said second component adsorbed on said adsorbent.

7. A method in accordance with claim 1 further comprising cooling said adsorbent to maintain said adsorbent at a temperature of 80° C. or less.

8. A method in accordance with claim 7 wherein said adsorbent is contacted with a purge gas stream while simultaneously conducting said irradiating and said cooling.

9. A method in accordance with claim 1 further comprising cooling said adsorbent to maintain said adsorbent at a temperature of 50° C. or less.

10. A method in accordance with claim 19 wherein said adsorbent is contacted with a purge gas stream while simultaneously conducting said irradiating and said cooling.

11. A method of desorbing a first gas adsorbed on a solid adsorbent and having a coefficient of dielectric loss of 0.5 or more while leaving adsorbed on said adsorbent at least a second gas, said first gas having a coefficient of dielectric loss which is at least 10 times as large as that of said second gas, said method comprising a step of contacting a gaseous desorbing medium with said adsorbent while irradiating said adsorbent with an electromagnetic wave having a frequency of 1 MHz to 25 GHz and while cooling to maintains aid adsorbent at a temperature of 30°-50° C.

12. A method as set forth in claim 11 wherein said adsorbent has a coefficient of dielectric loss of 0.01 or less.

13. A method as set forth in claim 12, wherein said adsorbent is silica gel, slumina, zeolite, titania, a clay mineral or a particulate synthetic resin.

14. A method as set forth in claim 11, wherein said first gas is moisture and said second gas is a chlorofluorocarbon.

* * * * *

UNITED STATES PATENT AND TRADEMARK OFFICE
CERTIFICATE OF CORRECTION

PATENT NO. : 5,282,886
DATED : February 1, 1994
INVENTOR(S) : KOBAYASHI et al

It is certified that error appears in the above-indentified patent and that said Letters Patent is hereby corrected as shown below:

Col. 6, line 25, "19" should read --9--; and line 38, "maintains aid" should read --maintain said--.

Signed and Sealed this

Sixth Day of September, 1994

Attest:

BRUCE LEHMAN

*Attesting Officer*   *Commissioner of Patents and Trademarks*